(12) United States Patent
Gazes et al.

(10) Patent No.: US 12,313,462 B2
(45) Date of Patent: May 27, 2025

(54) SYSTEMS AND METHODS TO REDISTRIBUTE FIELD OF VIEW IN SPECTROSCOPY

(71) Applicant: CHROMATION INC., Bronx, NY (US)

(72) Inventors: Michael Gazes, Forest Hills, NY (US); Nadia Pervez, Houston, TX (US); Ioannis Kymissis, New York, NY (US)

(73) Assignee: Chromation Inc., Bronx, NY (US)

( * ) Notice: Subject to any disclaimer, the term of this patent is extended or adjusted under 35 U.S.C. 154(b) by 285 days.

(21) Appl. No.: 18/030,247

(22) PCT Filed: Oct. 5, 2021

(86) PCT No.: PCT/US2021/053605
§ 371 (c)(1),
(2) Date: Apr. 4, 2023

(87) PCT Pub. No.: WO2022/076438
PCT Pub. Date: Apr. 14, 2022

(65) Prior Publication Data
US 2023/0384156 A1 Nov. 30, 2023

Related U.S. Application Data

(60) Provisional application No. 63/088,278, filed on Oct. 6, 2020.

(51) Int. Cl.
*G01J 3/02* (2006.01)
(52) U.S. Cl.
CPC ............. *G01J 3/0289* (2013.01); *G01J 3/021* (2013.01)

(58) Field of Classification Search
CPC ........ G01J 3/0289; G01J 3/021; G01J 3/0205; G01J 3/0256; G01J 3/0291
(Continued)

(56) References Cited

U.S. PATENT DOCUMENTS

| 5,121,030 A | 6/1992 | Schott |
| 5,214,736 A | 5/1993 | Uemiya et al. |

(Continued)

FOREIGN PATENT DOCUMENTS

| DE | 102010040768 A1 | 3/2012 |
| DE | 102016212088 A1 | 1/2018 |

(Continued)

OTHER PUBLICATIONS

International Preliminary Report on Patentability for PCT/US2017/032005, mailed Nov. 22, 2018, 8 pages.
(Continued)

*Primary Examiner* — Md M Rahman
(74) *Attorney, Agent, or Firm* — Cozen O'Connor

(57) ABSTRACT

An apparatus includes a substrate and an optically powered surface. The substrate is transmissive of electromagnetic energy, and includes a plurality of reflective portions oriented and positioned to control a propagation direction of electromagnetic energy along an optical path of the substrate. The substrate further includes an input surface aligned with the optical path so as to allow electromagnetic energy to enter the substrate through the input surface. The optically powered surface is positioned relative to the substrate so as to redirect a field of view of the substrate. The field of view of the substrate is bounded by a first angular width, a field of view of the optically powered surface is bounded by a second angular width, and the second angular width is different than the first angular width.

34 Claims, 6 Drawing Sheets

(58) Field of Classification Search
USPC .......................................................... 356/326
See application file for complete search history.

(56) References Cited

U.S. PATENT DOCUMENTS

| | | |
|---|---|---|
| 6,507,709 B2 | 1/2003 | Hirai et al. |
| 6,738,551 B2 | 5/2004 | Noda et al. |
| 6,879,451 B1 | 4/2005 | Hewlett et al. |
| 7,065,280 B2 | 6/2006 | Ogawa et al. |
| 7,092,101 B2 | 8/2006 | Brady et al. |
| 7,145,614 B2 | 12/2006 | Lee et al. |
| 7,274,458 B2 | 9/2007 | Perez et al. |
| 7,768,640 B2 | 8/2010 | Cunningham et al. |
| 8,854,624 B2 | 10/2014 | Pervez et al. |
| 2004/0007662 A1 | 1/2004 | Sidorin |
| 2006/0017928 A1 | 1/2006 | Crowther |
| 2008/0224121 A1 | 9/2008 | Bose et al. |
| 2008/0246961 A1 | 10/2008 | Zhang et al. |
| 2012/0206726 A1 | 8/2012 | Pervez et al. |
| 2013/0216180 A1 | 8/2013 | Tan et al. |
| 2016/0327746 A1 | 11/2016 | Mathai et al. |
| 2019/0041264 A1 | 2/2019 | Scholtz et al. |

FOREIGN PATENT DOCUMENTS

| | | |
|---|---|---|
| WO | 2011046875 A1 | 4/2011 |
| WO | 2012057792 A1 | 5/2012 |
| WO | 2012088117 A1 | 6/2012 |
| WO | 2013102661 A1 | 7/2013 |
| WO | 2013158842 A1 | 10/2013 |
| WO | 2015112169 A1 | 7/2015 |

OTHER PUBLICATIONS

International Search Report and Written Opinion for PCT/US2021/053605, mailed Jan. 18, 2022, 16 pages.
International Search Report for PCT/US2016/053925, mailed Mar. 27, 2017, 6 pages.
International Search Report for PCT/US2017/032005, mailed Aug. 21, 2017, 4 pages.
Pervez et al., "Integrated Light Management as a Path to Miniaturizing Spectrometers", Imaging and Applied Optics 2017.
Written Opinion for PCT/US2016/053925, mailed Mar. 27, 2017, 8 pages.
Written Opinion for PCT/US2017/032005, mailed Aug. 21, 2017, 6 pages.

SYSTEMS AND METHODS TO REDISTRIBUTE FIELD OF VIEW IN SPECTROSCOPY

BACKGROUND

Technical Field

The present disclosure relates generally to systems and methods to redistribute a field of view for use in optical applications. More specifically, the present disclosure describes the use of curved mirrors to adjust the field of view for optical analytical instruments, such as spectrometers.

Description of the Related Art

Spectrometers are analytical instruments that are able to identify the wavelengths that comprise incident electromagnetic energy (e.g., light), and provide spectral content information or data that characterizes the constituent components of the incident electromagnetic energy. Spectrometers are useful in a large variety of settings and applications. For example, spectroscopy can be used to analyze the color of light, the content of a number of chemical processes and reagents, the authenticity of documents, and many other applications in which the wavelength of light is modified by a target.

U.S. Pat. No. 8,854,624, generally describes a photonic crystal based spectrometer. U.S. Pat. No. 8,854,624, is an example of use of photonic crystals as scattering structures, and describes scattering from guided modes to free-space propagating modes. Known photonic crystal based spectrometers include a photonic crystal coupled to an outer surface of an optical waveguide to extract a portion of optical energy propagating through the waveguide via the photonic crystal.

Known spectrometers are designed with a field of view within which useful light is transmitted to the optically active elements of the spectrometer. Light outside of this field of view is considered "stray light" and may be rejected by the spectrometer as the stray light can lead to false signals and an incorrect final spectrum. Typically, the field of view for a given spectrometer is relatively small, for example compared to that of a human eye. Known spectrometers manufactured by Chromation have a field of view between about 2 degrees to about 3 degrees. Other known spectrometers, for example an industry standard Czerny-Turner spectrometer design can have a field of view of about 25.4 degrees. A human eye typically has a horizontal arc field of view of about 210 degrees and a vertical arc field of view of about 150 degrees. Numerous applications may benefit from a wider field of view for a given spectrometer, as a wider field of view will provide more light to the spectrometer thereby increasing sample size and reducing bias from a narrow area outlier.

BRIEF SUMMARY

Advantageously, an article can employ input optics and/or output optics to facilitate entry of electromagnetic energy (e.g., light including visible, infrared and/or ultraviolet ranges) onto an electromagnetic energy transmissive path. At least a portion of the path may be formed within an electromagnetic energy transmissive structure, such as a substrate (e.g., optically transmissive substrate, optical waveguide, planar waveguide), to facilitate extraction or exiting of electromagnetic energy out of the electromagnetic energy transmissive structure. At least a portion of the path may pass through a cavity, for example a cavity filled with a gaseous substance, such as air, or the cavity enclosing a vacuum, to facilitate extraction or exiting of electromagnetic energy out of the cavity.

An article can employ various types of nanostructures or regions of nanostructures as input optics and/or output optics, to respectively facilitate entry of electromagnetic energy respectively into and out of an electromagnetic energy transmissive structure such as a substrate. Additionally or alternatively, an article can employ a variety of other types of input optics, for example, apertures, mirrors or reflectors, prisms, focusing optics or lenses, and/or reflective or refractive surfaces to couple electromagnetic energy into the substrate.

According to one implementation an apparatus includes a substrate and an optically powered surface with a non-planar shape. As used herein, an optically powered surface refers to a surface which acts upon electromagnetic energy that contacts the optically powered surface. An optically powered surface reflects or refracts electromagnetic energy and examples of optically powered surfaces include lenses, prisms, mirrors, nanostructures, and filters. According to some implementations, the optically powered surface acts upon the electromagnetic energy without modifying the spectral content of the electromagnetic energy.

The substrate is transmissive of electromagnetic energy and supports a plurality of reflective portions oriented and positioned to control a propagation direction of the electromagnetic energy along an optical path. The substrate further includes an input surface aligned with the optical path so as to allow the electromagnetic energy to enter the substrate through the input surface. The substrate further including an input field of view within which electromagnetic energy that passes through the input surface propagates within the substrate by reflecting off of the plurality of reflective surfaces supported by the substrate. The optically powered surface is positioned relative to the substrate so as to the redirect electromagnetic energy within a field of view of the optically powered surface. The field of view of the substrate bounded by a first angular width, the field of view of the optically powered surface is bounded by a second angular width, and the second angular width is different than the first angular width.

According to one implementation a method of analyzing electromagnetic energy includes redirecting electromagnetic energy within a first field of view of an optically powered surface with the optically powered surface into a second field of view of a substrate such that the redirected electromagnetic energy passes through an input surface of the substrate. The method further includes, after redirecting the electromagnetic energy, reflecting the electromagnetic energy off of a plurality of reflective surfaces supported by the substrate. The method further includes, after reflecting the electromagnetic energy, separating various components of the electromagnetic energy, wherein the first field of view is bounded by a first angular width, the second field of view is bounded by a second angular width, the first angular width is different than the second angular width, and at least a portion of the first field of view is positioned outside the second field of view.

According to one implementation a method of fabricating an apparatus includes positioning a substrate, which is transmissive of electromagnetic energy, such that an optical path is established along which electromagnetic energy that enters the substrate through an input optic of the substrate propagates within the substrate. The method further includes positioning an optically powered surface relative to the substrate, such that the optically powered surface redirects electromagnetic energy within a first field of view of the optically powered surface into a second field of view of the substrate, the second field of view extending out from the input surface and including all angles along which electromagnetic energy that enters the substrate through the input surface will propagate within the substrate. The first field of view has a first angular width, the second field of view has a second angular width, and the second angular width is different than the first angular width.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with spectrometers and other electromagnetic energy measurement systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The term "aligned" as used herein in reference to two elements along a direction means a straight line that passes through one of the elements and that is parallel to the direction will also pass through the other of the two elements. The term "between" as used herein in reference to a first element being between a second element and a third element with respect to a direction or path means that the first element is closer to the second element as measured along the direction or path than the third element is to the second element as measured along the direction or path. The term "between" includes, but does not require that the first, second, and third elements be aligned along the direction or path.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein.

The headings and Abstract of the Disclosure provided herein are for convenience only and do not interpret the scope or meaning of the embodiments.

Figure 1:
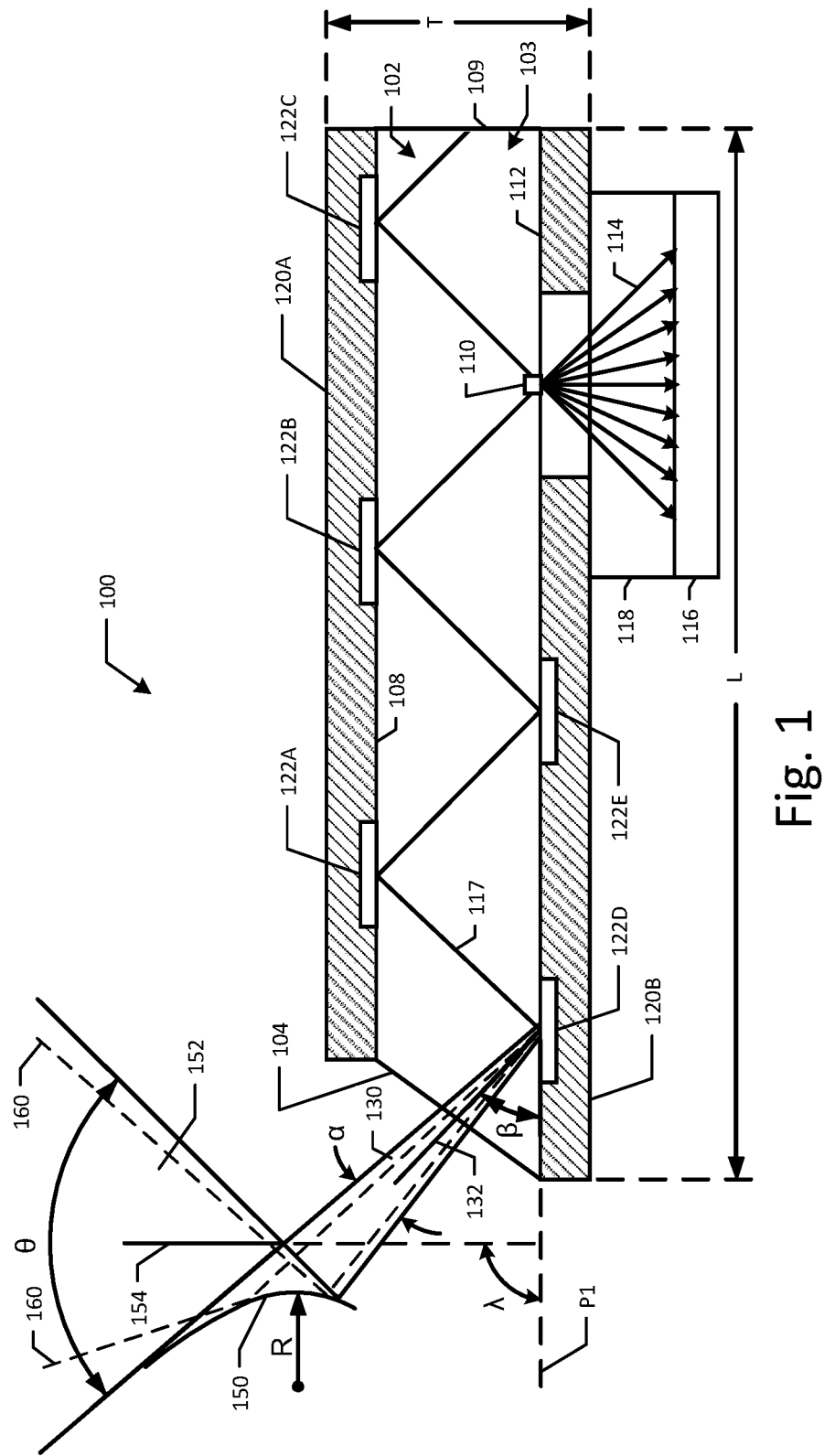
FIG. 1 is a cross-sectional side view of an apparatus according to one implementation, the apparatus including a substrate and an optically powered surface with a non-planar shape, the optically powered surface redistributing a field of view of the apparatus.

Referring to FIG. 1 an apparatus 100, according to one illustrated implementation, includes a substrate 102, which transmits electromagnetic energy of at least a set of wavelengths or frequencies that are of interest (i.e., ranges of wavelengths or frequencies that are to be detected or sensed or measured, e.g., electromagnetic energy in the optical range of wavelengths including electromagnetic energy in the visible range, the infrared range, and the ultraviolet range of the electromagnetic spectrum). According to one embodiment, the apparatus 100 includes a cavity 103 in place of the substrate 102. The cavity 103 may be filled with a gaseous substance, such as air, or the cavity 103 may enclose a vacuum, to facilitate extraction or exiting of electromagnetic energy out of the cavity 103. Although shown only in FIG. 1, any of the embodiments of the apparatus 100 described herein may include the cavity 103 in place of the substrate 102.

The apparatus 100 also includes an input surface 104 positioned and oriented to allow electromagnetic energy that intersects the input to pass into the substrate 102. The input surface 104 may include an optically powered surface (e.g., a lens, a mirror, etc.), or alternatively may provide passage into the substrate 102 without changing the characteristics (e.g., the direction of the electromagnetic energy) as it passes through the input surface 104.

The apparatus 100 may further include an output optic 110 laterally spaced from the input surface 104 along a length L of the substrate 102. In at least some implementations, the output optic 110 is in the form of regions of nanostructures, positioned and oriented proximate to a top major face 108 of the substrate 102, a bottom major face 112 of the substrate 102 (as shown), or an edge 109 of the substrate, to cause at least a portion of the electromagnetic energy (represented by a arrows 114, only one labeled) to pass out of the substrate 102. The output optic 110 may be formed in a respective layer or structure that is distinct from the substrate 102. In some implementations, the output optic 110 may be formed directly on and/or in the substrate 102. While illustrated as employing one output optic 110, some implementations may employ more than one output optic. Where there are two or more output optics, the output optics may be generally spaced along at least a length L of the substrate 102.

According to one implementation, the top major face 108 and the bottom major face 112 may be distinguishable from the edge 109 of the substrate 102 in that major faces 108 and 112 extend along two major axes of the substrate 102, that is the length L and a width W (not shown, into the page of the illustrated embodiment), while the edge 109 extends along a minor axis, that is a thickness T. It should be noted that in some implementations, the length L and the width W of the substrate 102 may be unequal to each other, such that the substrate 102 has a rectangular profile. In other implementations, the length L and the width W of the substrate 102 may be equal to one another, such that the substrate 102 has a square profile. In some instances, the substrate may transmit electromagnetic energy without total internal reflection.

The apparatus 100 may optionally include one or more detectors 116 (only one shown), positioned to detect electromagnetic energy that passes out of the substrate 102. As illustrated in FIG. 1, the detector 116 may be separated from the output optic 110 by a coupling layer or spacer 118 of a suitable thickness (e.g., 3 mm, less than 3 mm). In some implementations, one or more optical fibers (e.g., a faceplate) may extend between the output optics 110 and the detector 116. The coupling layer 118 or optical fibers are at least transmissive of electromagnetic energy of at least a set of wavelengths or frequencies that are of interest, and in most implementations, propagate light entering at such appropriate angles (e.g., via total internal reflection) from the output optics 110 to the detector 116.

The detector(s) 116 may take any of a variety of forms. For example, the detector(s) 116 may advantageously take the form of one or more optical detectors, sensors or transducers that are responsive to optical wavelengths or frequencies of electromagnetic energy, e.g., light in the visible, infrared and/or ultraviolet portions of the electromagnetic spectrum. Also for example, the detector(s) 116 may advantageously take the form of one or more optical linear detector arrays which are responsive to light at various positions along a length of the detector 116. The detector(s) 116 may, for example, take the form of one or more charge-coupled devices (CCDs), and/or one or more complementary-metal-oxide-semiconductor (CMOS) image detectors and/or other optical detector(s), sensor(s) or transducer(s) that produce signals (e.g., electrical signals) in response to incident light.

According to one implementation, the detector 116 may be 2D, such that the detector includes multiple pixels extending along both the length L and the width W. A 2D detector 116 may be advantageous in various applications, for example in making a push-broom hyperspectral imager.

The substrate 102 may, for example, take the form of a plane, substrate, or layer of electromagnetic energy transmissive material (e.g., optically transmissive material). The plane, substrate, or layer of transmissive material can be generally transmissive of electromagnetic energy of at least certain wavelengths or frequencies of interest (i.e., wavelengths or frequencies to be detected or sensed, e.g., light including visible, infrared and/or ultraviolet ranges), without any propensity to guide the electromagnetic energy (i.e., transmissive without total internal reflection). As a non-limiting example, the substrate 102 may be formed from fused silica.

Electromagnetic energy may be indiscriminately transmitted throughout the substrate 102. In some example implementations, nanostructures formed in or on the substrate 102 or otherwise optically coupled to the substrate can cause specific wavelength components of the electromagnetic energy to exit (e.g., be extracted from) the substrate. This approach can be employed to spatially resolve the components of the electromagnetic energy, which can be detected or sensed by a detector or sensor, and converted into information (e.g., raw information in analog or digital form) that is representative of wavelength distribution in the incident light. In other implementations, one or more other types of output optics may be included, such as apertures, filters, diffusers, lenses, etc.

In some implementations, the apparatus 100 may include one or more optical elements 111 (e.g., reflectors, spectrally selective elements, absorbers, dispersive and refractive elements, and diffusers). In some implementations, reflectors may be supported on or proximate to major faces of the substrate 102 to increase a length of a path for non-guided electromagnetic energy within the substrate 102. Additionally, patterned reflectors may be supported on or proximate to major faces of the substrate 102 to shape propagating electromagnetic energy distribution.

Each of the reflectors used for shaping the propagating electromagnetic energy distribution may be defined on the same major face of the substrate 102 or on different major faces. In some implementations, patterned reflectors on or proximate to major faces of the substrate 102 may be used to translate input electromagnetic energy toward one or more of the output optics 110 along the length L or width W of the substrate 102. Moreover, reflectors may be used to direct electromagnetic energy along an optical path 117 and/or to direct unwanted electromagnetic energy away from the optical path 117.

Spectrally selective elements may be formed within or supported on major faces of the substrate 102 to cause separation in the wavelength distribution of electromagnetic energy. Examples of spectrally selective elements may include diffractive, refractive, prismatic, scattering, and filter elements. In some implementations, reflection or transmission gratings may be formed on a major face of the substrate 102 to cause separation in the wavelength distribution of electromagnetic energy incident upon the spectrally selective elements.

Further, interference filters may be created on major faces of the substrate 102 to define a range of wavelengths which remain in the substrate 102 or exit the substrate 102. As noted above, photonic crystals may be used to scatter electromagnetic energy within the substrate 102 and out of the substrate 102.

In some implementations, patterned absorbers may be supported by one or more major faces of the substrate 102 to alter the propagating electromagnetic energy distribution. Such absorbers are discussed further below.

In some implementations of the present disclosure, patterned dispersive elements (e.g., Fresnel lenses, zone plates) are created on one or more major faces of the substrate 102 to define or reshape the electromagnetic energy distribution along the optical path 117. A curved mirror may also be created on a major face of the substrate to couple to one or more waveguide modes of the substrate or to reshape non-guided electromagnetic energy along the optical path.

In some implementations, a diffuser may be created on one or more of the major faces of the substrate 102 to alter the incident or exiting angular distribution of electromagnetic energy. Patterned diffusers may also be formed on one or more major faces of the substrate 102 to alter the angular distribution of a specific portion of electromagnetic energy along the optical path 117.

For at least some of the implementations discussed herein, optical structures supported on or proximate to major faces may be created by nanofabrication, bonding, or alignment of external components to the substrate, for example. Features on opposing major faces of the substrate 102 may be aligned to achieve the desired alteration of electromagnetic energy distribution along the folded optical path 117.

The optical elements may include a number of reflector portions or regions 122a-122e ("reflectors") and may optionally include a number of absorber portions or regions 120a-120b ("absorbers"). In the illustrated example of FIG. 1, the absorber 120a is proximate (e.g., adjacent or above) the top major face 108 of the substrate 102 and the absorber 120b is proximate (e.g., adjacent or below) the bottom major face 112 of the substrate. Also as shown, the reflectors 122a-122c may be proximate the top major face 108 of the substrate 102 and the reflectors 122d-122e may be proximate the bottom major face 112 of the substrate.

In some implementations, the reflectors 122 may be formed from reflective biaxially-oriented polyethylene terephthalate material (e.g., reflective Mylar®), deposited metal (e.g., aluminum), etc. In some implementations, the absorbers 120 may be formed from paint (e.g., black paint), paper (e.g., black paper), an absorptive coating or film, etc. In some implementations, the absorbers 120 may be filters that generally pass some wavelengths and/or frequencies of the electromagnetic energy and reflect others. In some instances some nominal amounts of the electromagnetic energy (e.g., wavelengths intended to be passed, wavelengths to be reflected, or wavelengths to be passed and reflected) may be absorbed (e.g., via heating the filter). In some implementations the apparatus 100 may include a wide band absorber that absorbs wavelengths and/or frequencies over all optical wavelengths, or alternatively, all wavelengths of interest (e.g., a subset of optical wavelengths).

The input surface 104, absorbers 120, reflectors 122 and/or output optic 110 may each be supported by, for example in direct contact with or proximate to one of the top major face 108 or the bottom major face 112 of the substrate 102. The absorbers 120 may form a coating or cladding that at least partially surrounds the substrate 102. The coating or cladding may provide an interface with one or more surfaces of the substrate 102 with a high ratio of refractive index (e.g., so as to facilitate total internal reflection for electromagnetic energy that enters the substrate 102 at an angle larger than a critical angle of the substrate).

According to one implementation the top major face 108 is formed of a single, continuous, planar surface, and the bottom major face 112 is similarly formed of a single, continuous, planar surface. Alternatively or additionally, one or more of such components may be distinct unitary separable elements that may or may not span the entire major faces. As another alternative, one or more of such components may be integrated into or directly on the substrate 102. As shown, the input surface 104 may be formed in one of the edges 109 of the substrate 102.

In the embodiment of the apparatus 100 of FIG. 1, the reflector regions 122 and absorber regions 120 are defined on both the top and bottom major faces 108, 112 to structure the range of angles of the electromagnetic energy 160. For example, the spatial extent of the reflector 122d spatially limits the electromagnetic energy reflected by the reflector 122d. The absorbers 120b adjacent the reflector 122d functions to manage stray light. In some implementations, absorbers may not be present adjacent the top or bottom major faces 108, 112 of the substrate 102. In such implementations, light which passes adjacent a reflector may simply be transmitted out of the substrate 102, where it may be absorbed by another component (e.g., an absorptive feature or system within a housing which contains the substrate 102). Similarly, the spatial extent of the reflector 122a spatially limits the electromagnetic energy reflected by the reflector 122a.

By selecting the patterns of reflectors (and optionally absorbers), the electromagnetic energy may be shaped and translated along a portion of an optical path 117 from the input surface 104 to the output optic 110 (or at least adjacent to the output optic 110). For example, such patterns may be selected to limit the numerical aperture of the electromagnetic energy incident on or adjacent to the output optic 110 and/or to limit the range of propagation angles of the electromagnetic energy within the substrate 102. Photons that are incident on the output optic 110 may pass out of the substrate 102, whether those photons are from a light beam or ray that has a principal axis that directly intersects the output optic 110, or has a principal axis that does not directly intersect the output optic 110, for instance a light beam or ray that has a principal axis that intersects a location that is adjacent the output optic. The reflectors 122 and absorbers 120 may be stacked layers external to the substrate 102 (e.g., with air gaps in the negative spaces of the absorbers). In some implementations these structures may be fabricated directly on the major faces 108 and 112 of the substrate 102, for example using nanofabrication techniques.

Based on one or more of the physical components of the substrate 102 as described above, (e.g., the optical elements 111) the substrate 102 may include an input field of view 130. In some implementations, the input field of view 130 may be defined using multiple features positioned on one or more major faces of the substrate 102. In some instances, the defining optical features used to define viewing angle may be separated by non-defining optical features along the folded optical path. Electromagnetic energy that enters the substrate 102 through the input surface 104, within the input field of view 130, may be reflected by one or more of the reflectors 122 to reach the output optic 110. The input field of view 130 is bounded by an angular width α (alpha). The substrate 102 may further include an input angle β (beta), measured from a plane P1, within which a number of the reflectors 122 (e.g., the reflectors 122d-e) lie, to a center line 132 of the input field of view 130. The input angle β (beta) may be referred to as the angle-of-attack for the substrate 102.

Due to constraints within the design of the substrate 102, the input field of view 130 is typically small, e.g., between about 2-3°, and up to about 10°. A larger field of view may be advantageous in a number of applications, for example when data for a larger area is desired, or where collection of electromagnetic energy from many different directions is desired. Increasing the input field of view 130 without compromising performance of the apparatus 100 is challenging. For example, increasing the size of the input surface 104 may require increasing the size of the apparatus 100 which may compromise a desired, compact, surface-mounted form factor for the apparatus 100. Additionally, changes to the size of the input surface 104, or the portion of the optical path 117 within the substrate 102 may negatively impact the effective resolution of the apparatus 100.

As shown in FIG. 1, the apparatus 100 may include an optically powered surface with a non-planar shape 150 (hereinafter "the optically powered surface 150") positioned so as to redirect the input field of view 130, such that electromagnetic energy within a redirected field of view 152, at least a portion of which is outside the input field of view 130, is redirected into the input field of view 130, through the input surface 104, and onto the optical path 117. The redirected field of view 152 of the optically powered surface 150 may be bounded, as shown, by an angular width θ (theta). The optically powered surface 150 may further include an input angle λ (lambda), measured from the plane P1, to a center line 154 of the redirected field of view 152 of the optically powered surface 150. The input angle λ (lambda) may be referred to as the angle-of-attack for the optically powered surface 150.

The characteristics (e.g., shape) and position (e.g., outside the substrate 102 and aligned with the optical path 117 as it exits the input surface 104) of the optically powered surface 150 may be tailored to enable electromagnetic energy from a different field of view, a different direction, or both to enter the input surface 104 along the optical path 117. As will be explained in detail below, the redirected field of view 152 of the optically powered surface 150 may have a greater angular width than the input field of view 130 of the substrate 102.

According to one implementation, the angular width θ (theta) may be at least double the angular width α (alpha). According to one implementation, the angular width θ (theta) may be at least ten times the angular width α (alpha). According to one implementation, the angular width θ (theta) may be at least twenty times the angular width α (alpha). According to one implementation, the angular width θ (theta) may be at least fifty times the angular width α (alpha). According to one implementation, the angular width θ (theta) may be 45° or greater. According to one implementation, the angular width θ (theta) may be 60° or greater. According to one implementation, the angular width θ (theta) may be 90° or greater. According to one implementation, the angular width θ (theta) may be 120° or greater. According to one implementation, the angular width θ (theta) may be between 45° and 120°. As will be explained in detail below, the redirected field of view 152 of the optically powered surface 150 may have a smaller angular width than the input field of view 130 of the substrate 102 such that the angular width θ (theta) is less than the angular width α (alpha).

The characteristics of the optically powered surface 150 may be tailored such that the electromagnetic energy that enters the substrate 102 through the input surface 104 (referred to herein as the input bundle) is collimated. Alternatively, the characteristics of the optically powered surface 150 may be tailored such that the electromagnetic energy that passes through the input surface 104 along the optical path 117 is not collimated.

The characteristics of the optically powered surface 150 may be tailored such that the electromagnetic energy within the redirected field of view 152 that is redirected to pass through the input surface 104 along the optical path 117 is uniformly distributed. Alternatively, characteristics of the optically powered surface 150 may be tailored such that the electromagnetic energy within the redirected field of view 152 that is redirected to pass through the input surface 104 along the optical path 117 is non-uniformly distributed.

According to one implementation the input angle λ (lambda) may be different than the input angle β (beta). As shown, the input angle β (beta) may be 45° and the input angle λ (lambda) may be 90°. According to one implementation, the input angle β (beta) may be 90°. According to one implementation, the input angle λ (lambda) may be 0° (such that the center line 154 extends away from the optically powered surface 150 to the left from the view shown in FIG. 1). According to one implementation, the input angle λ (lambda) may be 180° (such that the center line 154 extends away from the optically powered surface 150 to the right from the view shown in FIG. 1).

In certain applications there may be a desired area within which the electromagnetic energy is to be collected. The optically powered surface 150 may enable the use of a substrate 102 with a given input angle to collect electromagnetic energy from the desired area even if that area lies outside the input field of view 130 and the input angle β (beta).

As shown in FIG. 1, the optically powered surface 150 may have a curvature. The curvature may be constant, such that the optically powered surface 150 forms part of a circle. The curvature may be variable, such that the optically powered surface 150 has a varying radius of curvature R. The optically powered surface 150 may have a curvature that is constant over a portion of the optically powered surface 150 and variable over another portion of the optically powered surface 150. The optically powered surface 150 may be convex, as shown in FIG. 1. Alternatively, the optically powered surface 150 may be concave. The optically powered surface 150 may be reflective (e.g., the optically powered surface 150 may be mirrored). Alternatively, the optically powered surface 150 may be transmissive (e.g., the optically powered surface 150 may allow passage of electromagnetic energy while "bending" the electromagnetic energy as a lens). The optically powered surface 150 may include a plurality of planar portions, with each of the planar portions being angularly offset from others of the plurality of planar portions.

According to one implementation, the apparatus 100 may be used to analyze electromagnetic energy. The method may include redirecting electromagnetic energy 160 (shown as dashed lines, two of which are illustrated and identified) within the redirected field of view 152 of the optically powered surface 150 with the optically powered surface 150 onto the optical path 117 that passes through the input surface 104 of the substrate 102. The method may further include, after redirecting the electromagnetic energy 160, reflecting the electromagnetic energy 160 off of the plurality of reflective surfaces 122 positioned within the substrate 102.

The method may further include, after reflecting the electromagnetic energy 160 off of the plurality of reflective surfaces 122, separating various components of the electromagnetic energy 160 (e.g., by passing the electromagnetic energy 160 through the output optic 110).

Figure 2:
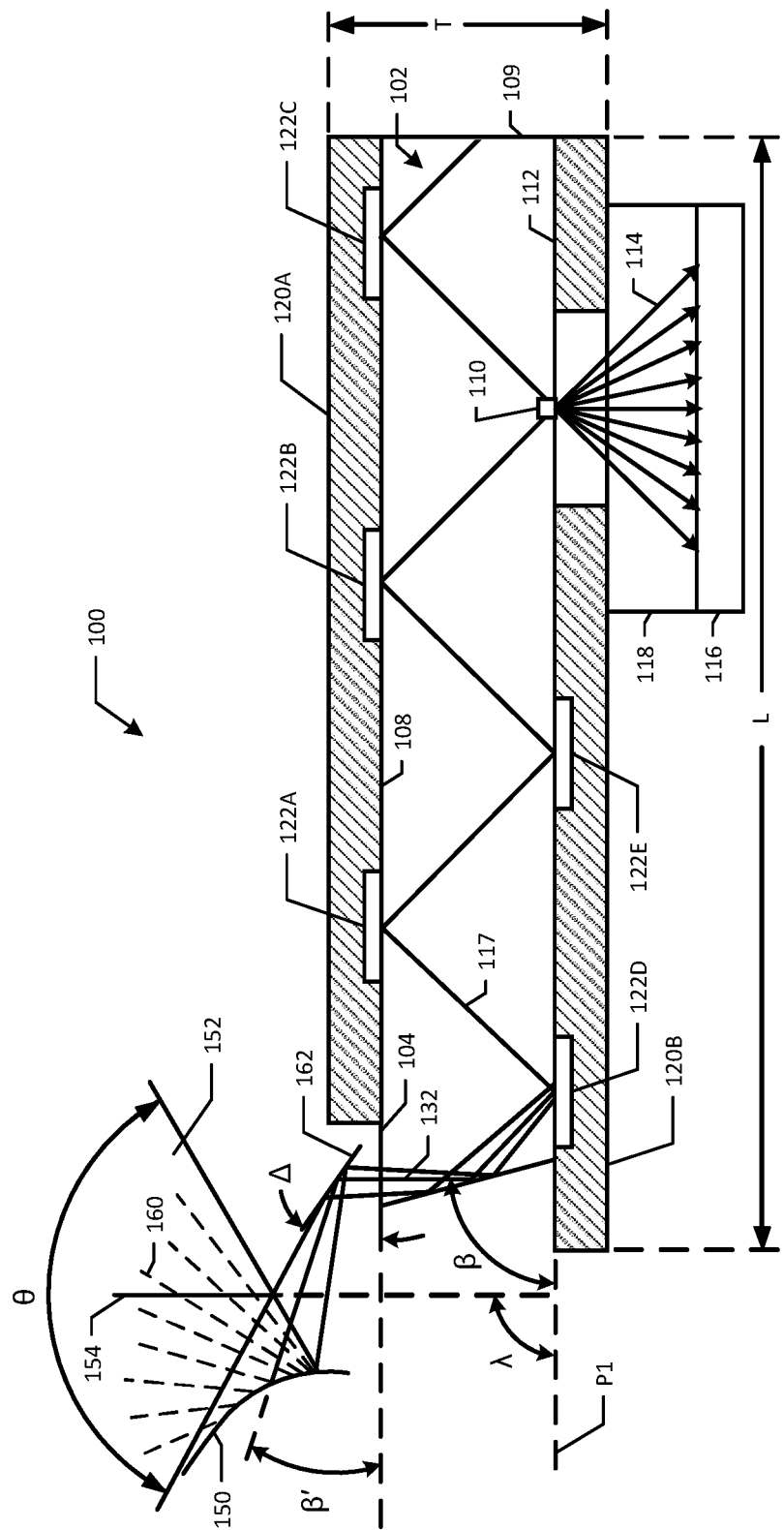
FIG. 2 is a cross-sectional side view of an apparatus according to one implementation, the apparatus including a substrate and an optically powered surface with a non-planar shape, the optically powered surface uniformly redistributing a field of view of the apparatus.

Referring to FIG. 2, the apparatus 100 may include an intermediate reflective surface 162 (e.g., a linear, planar, mirror) positioned between the input surface 104 of the substrate 102 and the optically powered surface 150 with respect to the optical path 117 so as to redirect electromagnetic energy that has been redirected by the optically powered surface 150 through the input surface 104. The intermediate reflective surface 162 may be supported at an angle Δ (delta) with respect to the plane P1.

As shown, the apparatus 100 may include a substrate 102 with the input angle β (beta) and the input angle λ (lambda) being equal, (e.g., 90° as shown in the illustrated embodiment). Thus, the intermediate reflective surface 162 and the optically powered surface 150 cooperatively change the size of the field of view within which electromagnetic energy can be collected and directed to the detector 116, while the input angle for the electromagnetic energy remains the same. According to one embodiment, the angle Δ (delta) may be about 60°, thus changing the angle β' (beta prime) of the optical path 117 from about 90° to about 30°, at which the optical path 117 intersects the optically powered surface 150.

Figure 3:
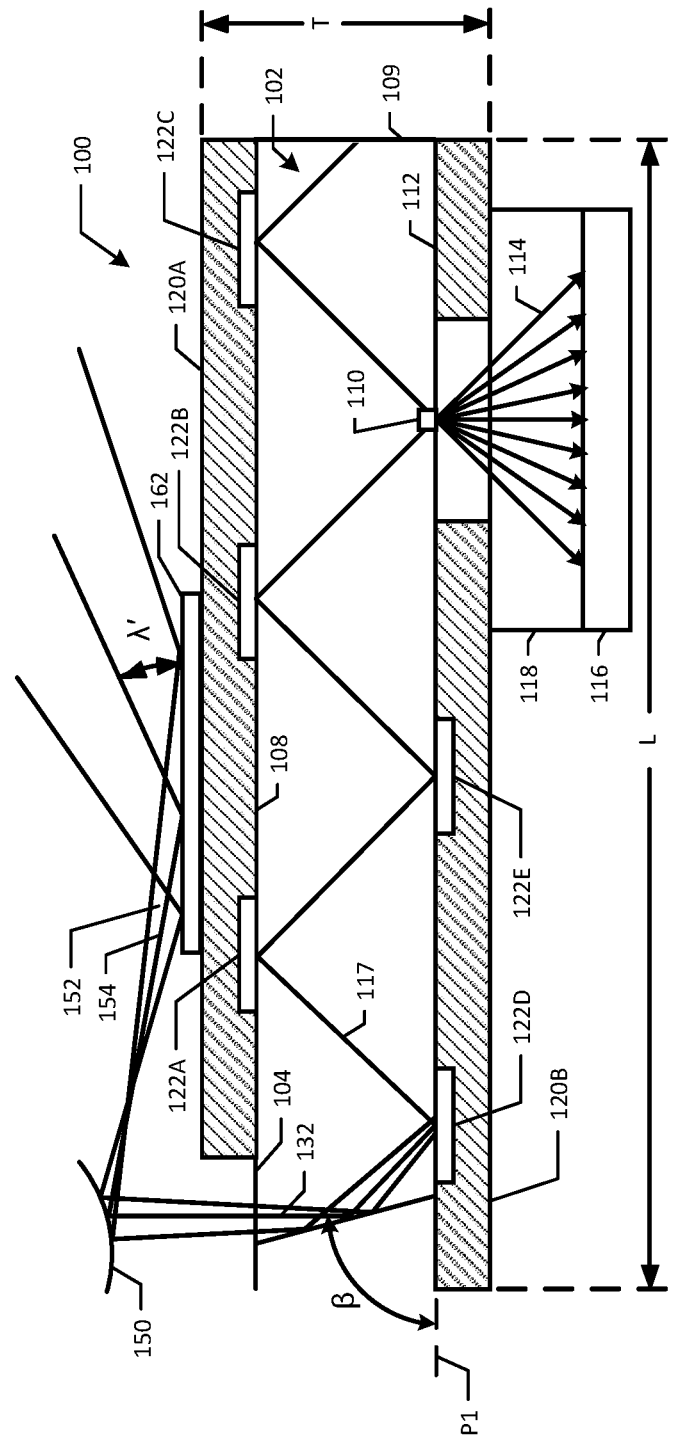
FIG. 3 is a cross-sectional side view of an apparatus according to one implementation, the apparatus including a substrate, an optically powered surface with a non-planar shape, and an intermediate reflecting surface, the optically powered surface and the reflecting surface cooperatively redistributing a field of view of the apparatus.

Referring to FIG. 3, the apparatus 100 may include the intermediate reflective surface 162 positioned within the redirected field of view 152 of the optically powered surface 150 so as to redirect electromagnetic energy into the redirected field of view 152 and toward the optically powered surface 150 where the electromagnetic energy is then redirected through the input surface 104 and into the substrate 102 along the optical path 117. Thus, the optically powered surface 150 provides an increased field of view which is then redirected to an input angle λ' (lambda prime) by the intermediate reflective surface 162.

The intermediate reflective surface 162 may include a reflective film (e.g., on an exterior surface of the substrate 102). Such an arrangement may be beneficial for use in an integrated sensing platform, or a system on a chip. The intermediate reflective surface 162 may be a functional surface, an indicator, or a microfluidic structure.

Figure 4:
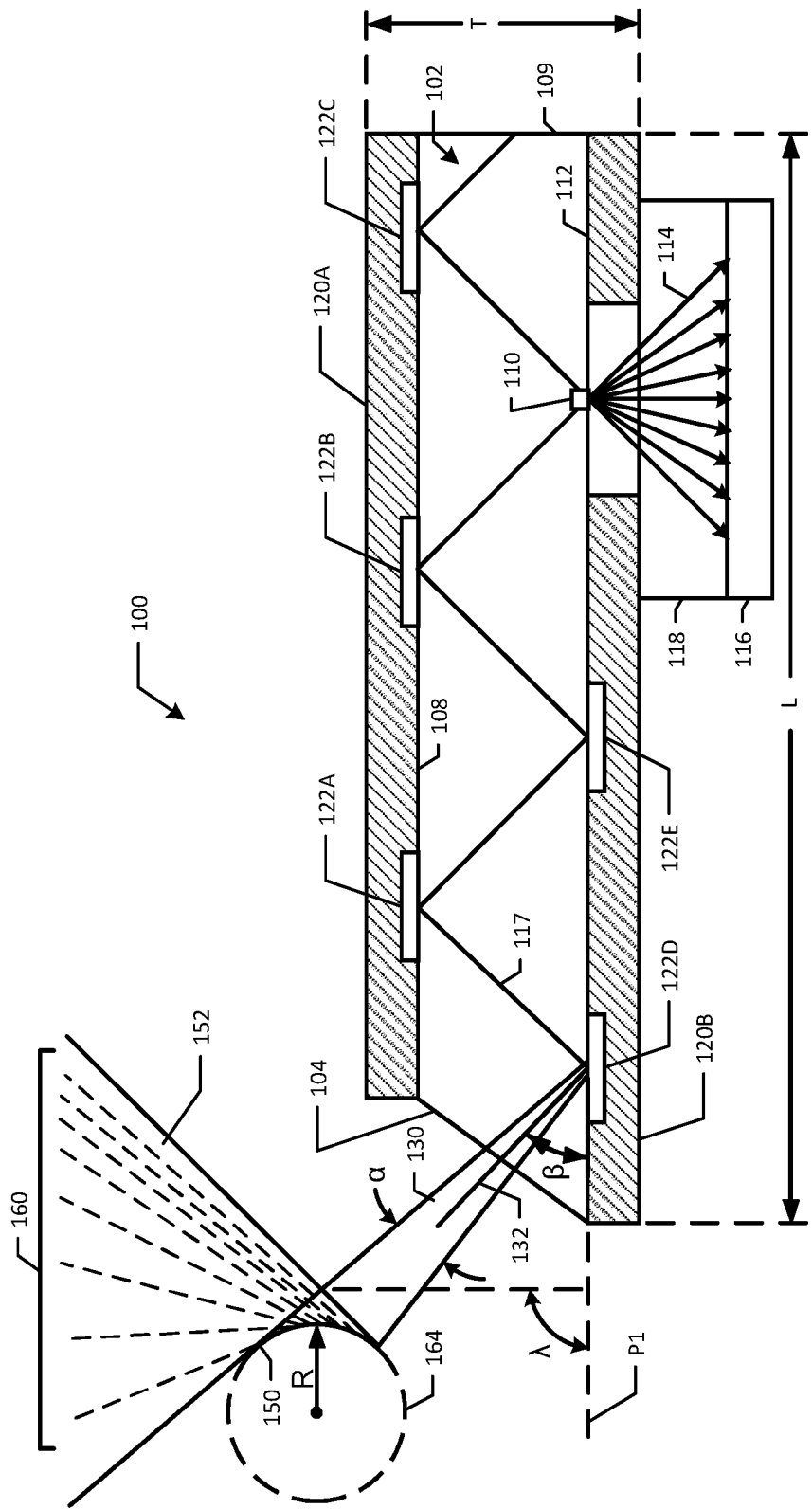
FIG. 4 is a cross-sectional side view of an apparatus according to one implementation, the apparatus including a substrate and an optically powered surface with a non-planar shape, the optically powered surface non-uniformly redistributing a field of view of the apparatus.

Referring to FIGS. 1 to 4, the optically powered surface 150 may be shaped to determine whether the redistribution of the input field of view 130 to the redirected field of view 152 is uniform or non-uniform. In a uniform redistribution (e.g., as shown in FIG. 2), the density of rays of the electromagnetic energy 160 that reflect off of the optically powered surface 150, into the input field of view 130, and through the input surface 104, are evenly spaced. In a non-uniform redistribution (e.g., as shown in FIG. 4), the density of rays of the electromagnetic energy 160 that reflect off of the optically powered surface 150, into the input field of view 130, and through the input surface 104, are unevenly spaced. A non-uniform distribution may be an intentional design feature or it may be the result of approximating a uniform redistributing reflector shape (e.g., a shape with a varying radius of curvature) with a more easily manufactured shape (e.g., a shape with a constant radius of curvature).

Referring to FIG. 4, the radius of curvature R of the optically powered surface 150 may be constant, such that the optically powered surface 150 forms part of a circle 164. As shown, the curvature of the optically powered surface 150 may result in a non-uniform redistribution (e.g., the rays of the electromagnetic energy 160 to the right of the redirected field of view 152 being are closer together than the rays of the electromagnetic energy 160 to the left of the field of view 152).

Figure 5:
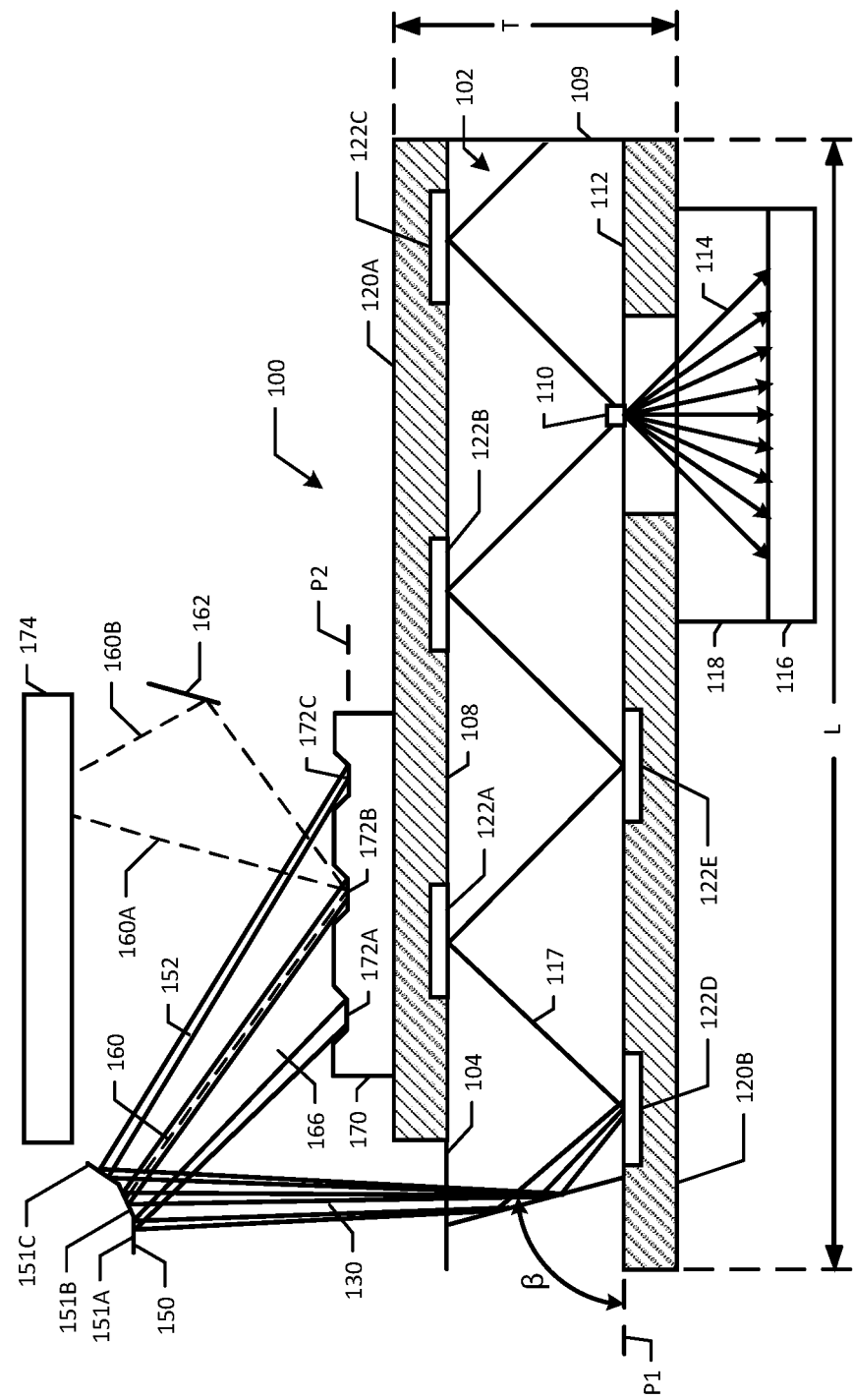
FIG. 5 is a cross-sectional side view of an apparatus according to one implementation, the apparatus including a substrate and an optically powered surface with a non-planar shape, the optically powered surface redistributing a field of view of the apparatus such that the field of view forms a number of gaps.

Referring to FIG. 5, the apparatus 100 may include a non-uniform redistribution that forms blind spots 166 within the field of view 152. The blind spots 166 may be implemented in a manner that improves performance of the apparatus 100 by omitting regions on a measurement plane P2 that do not contribute information to the measurement signal, or that present information whose omission or attenuation improves performance of the apparatus 100. According to one implementation, the non-uniform redistribution may be used to adjust the contributions from different locations on the measurement plane P2 with a significantly different response magnitude to the same excitation (e.g., measured fluorescence intensity). This balancing may enable collection of information from multiple locations, simultaneously.

As shown, the optically powered surface 150 may include a plurality of planar portions 151a-c, with each of the planar portions 151a-c being angularly offset from others of the plurality of planar portions 151a-c so as to produce a non-uniform field of view 152 with one or more blind spots 166. The apparatus 100 may include a lab-on-a-chip 170 that includes multiple, discrete sensing surfaces 172a-c. Use of the discrete sensing surfaces 172a-c may be beneficial in preventing unwanted physical mixing of sensing components.

The apparatus 100 may further include an electromagnetic energy source 174 (e.g., a light source). According to one implementation, the apparatus 100 may include the intermediate reflective surface 162. The intermediate reflective surface 162 may be positioned so as to reflect electromagnetic energy 160 from the electromagnetic energy source 174 to one of the discrete sensing surfaces 172a-c, where the electromagnetic energy 160 is then reflected to the optically powered surface 150, before being redirected into the input field of view 130 and through the input surface 104.

Thus, according to one implementation, the apparatus 100 may collect electromagnetic energy 160 from more than one path. For example, a first ray 160a of the electromagnetic energy 160 may travel from the electromagnetic energy source 174 directly to one of the discrete sensing surfaces 172a-c, and then to the optically powered surface 150 to be redirected into the input field of view 130 and through the input surface 104. A second ray 160b of the electromagnetic energy 160 may travel from the electromagnetic energy source 174 to the intermediate reflective surface 162, which may be a functional surface that performs a modification to the electromagnetic energy 160, the second ray 160b reflects off of the intermediate reflective surface 162 to one of the discrete sensing surfaces 172a-c, and then to the optically powered surface 150 to be redirected into the input field of view 130 and through the input surface 104.

Referring to FIGS. 1 to 6, the optically powered surface 150 may redirect the majority up to an entirety of the electromagnetic energy 160 from the redirected field of view 152 to the input field of view 130. However, it may be advantageous to at least partially preserve the electromagnetic energy 160. One example of an advantageous application of the preserved electromagnetic energy is in the use of "stacked" (or multiple) field of view redistributions. Another potential advantage is in dual use scenarios (e.g., measuring light reflected from a scene and also measuring the light from the ambient lighting illuminating the scene.

Figure 6:
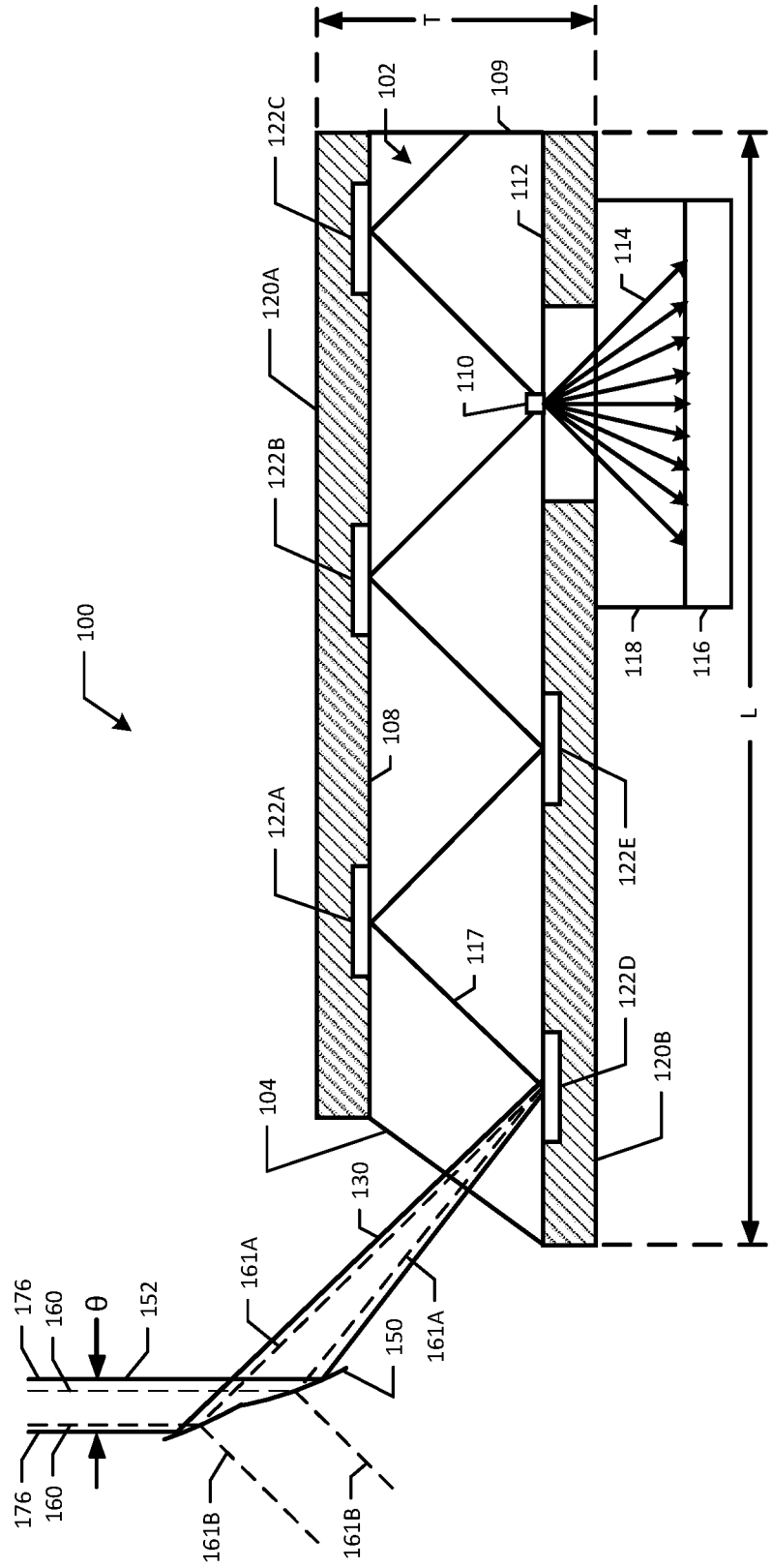
FIG. 6 is a cross-sectional side view of an apparatus according to one implementation, the apparatus including a substrate, and further including an optically powered surface with a non-planar shape, the optically powered surface redistributing a field of view of the apparatus.

As shown in FIG. 6, the optically powered surface 150 of the apparatus 100 may redirect a first portion 161a of the electromagnetic energy 160 from the redirected field of view 152 to the input field of view 130 and the optical path 117, and while redirecting a second portion 161b of the electromagnetic energy 160 from the redirected field of view 152 away from the input surface 104. According to one implementation, the optically powered surface 150 may be partially silvered. The optically powered surface 150 may be concave, as shown in the illustrated embodiment. According to one embodiment, the optically powered surface 150 may be convex. Thus, the optically powered surface 150 may be reflective, refractive, or both reflective and refractive.

According to one implementation, the redirected field of view 152 of the optically powered surface 150 is smaller than the input field of view 130 of the apparatus 102. The smaller field of view 152 may provide an advantage in applications where the distance to the measurement plane is unknown. The angular width θ (theta) of the field of view 152, according to one embodiment, may be 0° (i.e., boundary lines 176 of the redirected field of view 152 are parallel). In an embodiment of the apparatus 100 in which the angular width θ (theta) of the redirected field of view 152 is a non-zero value, a size of a measurement spot increases as distance to the measurement spot increases. In an embodiment of the apparatus 100 in which the angular width θ (theta) of the redirected field of view 152 is zero, the size of the measurement spot remains constant even as distance to the measurement spot changes. A constant size for the measurement spot may be desirable in applications such as distinguishing an individual body temperature within a crowd of people.

Referring to FIGS. 1 to 6, according to one implementation, a method of fabricating the apparatus 100 may include positioning the substrate 102, which is transmissive of electromagnetic energy, such that the optical path 117 is established, wherein electromagnetic energy that enters the substrate along the optical path propagates within the substrate. The method may include positioning the optically powered surface 150 relative to the substrate 102, such that the optically powered surface 150 intersects the optical path 117, and the optically powered surface 150 redirects the electromagnetic energy 160 within the redirected field of view 152 of the optically powered surface 150 into the substrate 102 along the optical path 117, wherein the angular width θ (theta) of the redirected field of view 152 is different than the angular width α (alpha) of the input field of view 130.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

Many of the methods described herein can be performed with variations. For example, many of the methods may include additional acts, omit some acts, and/or perform acts in a different order than as illustrated or described.

The various implementations and embodiments described above can be combined to provide further embodiments. For example, any of the characteristics of any embodiment of the optically powered surface 150 may be combined with any other embodiment of the optically powered surface 150 (e.g., a convex shaped embodiment of the optically powered surface 150 may be reflective, refractive, or both reflective and refractive, or a curved embodiment of the optically powered surface 150 may be used to form the redirected field of view 152 with the blind spots 166).

To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Pat. No. 10,656,013, issued on May 19, 2020; U.S. Publication No. 2019/0353522, published on Nov. 21, 2019; and U.S. Patent Application No. 63/088,278, filed on Oct. 6, 2020, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus comprising:
a substrate that is transmissive of electromagnetic energy, the substrate including an input surface that provides entry for electromagnetic energy into the substrate, the substrate further including an input field of view within which electromagnetic energy that passes through the input surface propagates within the substrate by reflecting off of a plurality of reflective surfaces supported by the substrate; and
an optically powered surface with a non-planar shape, the optically powered surface positioned relative to the substrate so as to redirect the input field of view thereby forming a redirected field of view, at least a portion of which is outside the input field of view,
wherein the input field of view is bounded by a first angular width measured at a location between the input surface and the optically powered surface, the redirected field of view is bounded by a second angular width, and the second angular width is different than the first angular width.

2. The apparatus of claim 1 wherein:
a subset of the plurality of reflective surfaces lie within a plane;
the input field of view is oriented at a first input angle that is measured from the plane to a center line of the input field of view at the location between the input surface and the optically powered surface; and
the redirected field of view is oriented at a second input angle that is measured from the plane to a center line of the redirected field of view.

3. The apparatus of claim 2 wherein the second input angle is different than the first input angle.

4. The apparatus of claim 1, wherein the optically powered surface is positioned within the input field of view.

5. The apparatus of claim 1, further comprising:
a reflective surface positioned within the input field of view between the input optic and the optically powered surface so as to redirect the input field of view toward the optically powered surface, thereby forming an intermediate field of view.

6. The apparatus of claim 1, further comprising:
a reflective surface positioned within the redirected field of view of the optically powered surface so as to redirect the redirected field of view.

7. The apparatus of claim 1 wherein the optically powered surface is a reflective surface of a mirror.

8. The apparatus of claim 1 wherein at least a portion of the optically powered surface is concave.

9. The apparatus of claim 8 wherein the concave portion of the optically powered surface has a varying radius of curvature.

10. The apparatus of claim 8 wherein the concave portion of the optically powered surface has a constant radius of curvature along an entirety of the concave portion.

11. The apparatus of claim 1 wherein at least a portion of the optically powered surface is convex.

12. The apparatus of claim 11 wherein the convex portion of the optically powered surface has a varying radius of curvature.

13. The apparatus of claim 11 wherein the convex portion of the optically powered surface has a constant radius of curvature along an entirety of the convex portion.

14. The apparatus of claim 1 wherein at least a portion of the optically powered surface includes a plurality of planar portions each angularly offset from others of the plurality of planar portions.

15. The apparatus of claim 1 wherein the second angular width is greater than the first angular width.

16. The apparatus of claim 1 wherein the second angular width is less than the first angular width.

17. A method of analyzing electromagnetic energy, the method comprising:
redirecting electromagnetic energy within a first field of view of an optically powered surface with the optically powered surface into a second field of view of a substrate such that the redirected electromagnetic energy passes through an input surface of the substrate;
after redirecting the electromagnetic energy, reflecting the electromagnetic energy off of a plurality of reflective surfaces supported by the substrate; and
after reflecting the electromagnetic energy, separating various components of the electromagnetic energy,
wherein the first field of view is bounded by a first angular width, the second field of view is bounded by a second angular width, the first angular width is different than the second angular width, and at least a portion of the first field of view is positioned outside the second field of view.

18. The method of claim 17 wherein the first field of view is oriented at a first input angle that is measured from a plane to a center line of the first field of view, the second field of view is oriented at a second input angle that is measured from the plane to a center line of the second field of view, and the first input angle is different than the second input angle.

19. The method of claim 17, further comprising:
redirecting the redirected electromagnetic energy with a reflective surface positioned between the input surface and the optically powered surface.

20. The method of claim 17, further comprising:
prior to redirecting the electromagnetic energy with the optically powered surface, redirecting the electromagnetic energy into the first field of view and toward the optically powered surface with a reflective surface positioned within the first field of view.

21. The method of claim 17 wherein the electromagnetic energy within the first field of view and redirected to the second field of view has a uniform density prior to being redirected by the optically powered surface.

22. The method of claim 17 wherein the electromagnetic energy within the first field of view and redirected into the second field of view has a non-uniform density prior to being redirected by the optically powered surface.

23. The method of claim 21 wherein the electromagnetic energy within the first field of view and redirected into the second field of view has a uniform density after being redirected by the optically powered surface.

24. The method of claim 21 wherein the electromagnetic energy within the first field of view and redirected into the second field of view has a non-uniform density after being redirected by the optically powered surface.

25. The method of claim 17 wherein redirecting the electromagnetic energy within the field of view includes redirecting a plurality of discrete channels of electromagnetic energy, each of the plurality of discrete channels forming a portion of the electromagnetic energy within the field of view, and each of the plurality of discrete channels separated from adjacent ones of the plurality of discrete channels by a portion of the electromagnetic energy within the field of view that is not redirected by the optically powered surface.

26. The method of claim 17 wherein redirecting the electromagnetic energy further comprises:
redirecting a first portion of the electromagnetic energy that traveled to the optically powered surface along a first path, the first path including reflecting off of a first surface and then reflecting off of a second surface before being redirected by the optically powered surface; and
redirecting a second portion of the electromagnetic energy that traveled to the optically powered surface along a second path, the second path including reflecting off of the second surface without first contacting the first surface.

27. The method of claim 17 wherein the optically powered surface is a concave surface, and redirecting the electromagnetic energy within the first field of view includes redirecting the electromagnetic energy with the concave surface.

28. The method of claim 17 wherein the optically powered surface is a convex surface, and redirecting the electromagnetic energy within the first field of view includes redirecting the electromagnetic energy with the concave surface.

29. The method of claim 27 wherein the optically powered surface is a reflective surface of a mirror.

30. The method of claim 17 wherein the first angular width is greater than the second angular width.

31. The method of claim 17 wherein the first angular width is less than the second angular width.

32. A method of fabricating an apparatus, the method comprising:
positioning a substrate, which is transmissive of electromagnetic energy, such that an optical path is established along which electromagnetic energy that enters the substrate through an input optic of the substrate propagates within the substrate; and
positioning an optically powered surface relative to the substrate, such that the optically powered surface redirects electromagnetic energy within a first field of view of the optically powered surface into a second field of view of the substrate, the second field of view extending out from the input surface and including all angles along which electromagnetic energy that enters the substrate through the input surface will propagate within the substrate, wherein the first field of view has a first angular width, the second field of view has a second angular width, and the second angular width is different than the first angular width.

33. The method of claim 32, further comprising:

positioning a reflective surface within the second field of view such that the reflective surface redirects electromagnetic energy redirected by the optically powered surface into the second field of view.

34. The method of claim 32, further comprising:

positioning a reflective surface within the first field of view such that electromagnetic energy reflects off of the reflective surface, into the first field of view, and towards the optically powered surface.

* * * * *